United States Patent
Smith

[11] Patent Number: 5,722,170
[45] Date of Patent: Mar. 3, 1998

[54] CARTRIDGE ACTUATED CABLE CUTTER

[76] Inventor: Walter C. Smith, 2908 Oakwood La., Torrance, Calif. 90505

[21] Appl. No.: 665,229

[22] Filed: Jun. 17, 1996

[51] Int. Cl.$^6$ .................................................. B26D 15/00
[52] U.S. Cl. ................................ 30/228; 30/241; 227/10
[58] Field of Search ........................... 30/228, 241, 180, 30/182; 114/221 A; 227/9, 10

[56] References Cited

U.S. PATENT DOCUMENTS

| | | | |
|---|---|---|---|
| 2,766,525 | 10/1956 | Hoffman | 30/228 |
| 4,349,141 | 9/1982 | Ollivier et al. | 227/10 |

Primary Examiner—Douglas D. Watts
Attorney, Agent, or Firm—Frederick Gotha

[57] ABSTRACT

An explosive cartridge actuated cable cutter device is presented which has a housing with a longitudinal axis and an axially extending bore therein where the bore has a circumferential step extending radially into the bore defining a reaction shoulder and a frame carried by the housing which extends axially at the cutting end of the device. A reaction blade is carried by the frame and extends laterally across the longitudinal axis and acts in conjunction with a cutting blade to shear power transmission line or underground cable. The shearing action is achieved through the use of a piston member which has a piston head and piston rod and is slideably mounted within the bore. The piston head has an impact shoulder which has a diameter greater than the piston rod and an attenuator sleeve is mounted in slideable relationship with the piston rod and is adapted within the housing to permit compressive engagement of the attenuator sleeve with both the impact shoulder and the reaction shoulder upon a predetermined axial displacement of the piston member. The use of the attenuator sleeve permits a shorter cutting stroke and prolongs the life of the cutter and reaction blades.

4 Claims, 2 Drawing Sheets

CARTRIDGE ACTUATED CABLE CUTTER

FIELD OF THE INVENTION

This invention relates to an explosive cartridge actuated cable cutter for use in cutting overhead power transmission lines and underground power transmission lines during replacement, rework or new installation.

BACKGROUND OF THE INVENTION

Overhead power transmission lines may have as many as 84 aluminum strands in a cable bundle or as many as 19 steel strands in a bundle. In cutting power lines, it is desirable to shear the power line from both sides in order to prevent the deformation of the sections so that the cable can be reworked and reattached. In the prior art, power line cables were cut utilizing a hydraulic actuated cutter which required heavy gas or electric driven hydraulic pumps and very heavy cable cutters. Thus, the weight of the equipment needed in the prior art to cut transmission power lines in many instances because of terrain conditions and the height of the cable above ground made such an undertaking expensive and time-consuming.

Explosively actuated cable cutting tools have been developed for use underwater. In U.S. Pat. No. 3,257,724 an underwater explosively actuated cable cutter is described. The underwater cable cutter utilizes the high pressure gases released from the detonation of the cartridge to accelerate a piston-cutting blade assembly. The deceleration or dissipation of the kinetic energy of the piston is achieved through trapping some of the gas on the opposite side of the piston and thereby cushioning the piston-cutting assembly during the cutting of the cable. Another explosive gas cartridge cutting tool is illustrated in U.S. Pat. No. 5,465,490, entitled "Rescue Chopping Tool". In this invention, the impact stress on the piston is reduced because the piston engages a slideable barrel which results in a kinetic energy transfer to the larger mass combination of barrel and piston and consequently the velocity of the combination is less than the previous velocity of the piston. The device also utilizes a spring which does not dissipate the energy but stores it and in so doing decelerates the combination of barrel and piston as the combination approaches the housing or body carrying the combination. In the prior art, the devices described in the above-mentioned patents are expensive to produce and require a cutting stroke in which the velocity of the cutting blade and hence the energy transfer to the work piece to be cut is diminished because of the loss of kinetic energy during the cutting stroke. Thus, it is desirable to maintain high energy during the cutting portion of the stroke and thereafter to rapidly dissipate the energy to protect the cutting blade.

SUMMARY OF THE INVENTION

The present invention is directed to an explosive cartridge cable cutting tool which has the capability of being operated, reset and used again without damage to the blade or mechanism; the cutting action shears the cable from both sides thereby preventing a deformation of the cut section and permits the cable to be reworked and easily reattached. To stop the cutting blade after the gas cartridge is detonated, the present invention utilizes a polyurethane shock attenuator sleeve which permits the kinetic energy of the piston to be dissipated over an extremely short stroke. Also to minimize the length of the stroke, a pivoted frame is utilized so that the cable can be placed between a cutting blade and reaction blade thereby shortening the stroke during the shearing process of cutting the cable.

The explosive cartridge cable cutting tool of this invention has a housing which has a longitudinal axis and an axially extending bore therein where the bore has a circumferential step extending radially and defining a reaction shoulder within the bore. A frame is carried by the housing and extends axially from the cutting end of the tool. A reaction blade is carried in fixed relationship with the frame and extends laterally across the longitudinal axis and acts in combination with the cutting blade to shear the cable with minimum deformation. A piston member which is composed of an integrally connected piston and piston rod is slideably mounted within the bore for axial displacement relative to the housing; the piston member has a radially extending impact shoulder axially of the surface of the piston head which has a diameter greater than the piston rod. The cutting blade is carried by the piston rod and extends laterally across the longitudinal axis and is substantially parallel to the reaction blade but laterally displaced therefrom.

To form a breech closure, a cylinder head member is removeably mounted to the housing. The cylinder head member has an axially extending cartridge bore which is in fluid communication with the piston head and permits the explosive energy of the cartridge to be translated into the kinetic energy of the piston. An attenuator sleeve is mounted in slideable relationship with the piston and is so adapted within the housing to permit compressive engagement of the attenuator sleeve with both the impact shoulder and the reaction shoulder upon a predetermined axial displacement of the piston member. The attenuator sleeve is preferably made of a polyurethane material which absorbs and dissipates the kinetic energy of the pistion member at the conclusion of the cutting stroke. The cartridge is detonated by means of a firing pin which is actuated by pulling a trigger which drives the firing pin into the cartridge.

BRIEF DESCRIPTION OF THE DRAWINGS

These and other features and advantages will become appreciated as the same become better understood with reference to the following specification, claims and drawings wherein:

DETAILED DESCRIPTION

Figure 1:
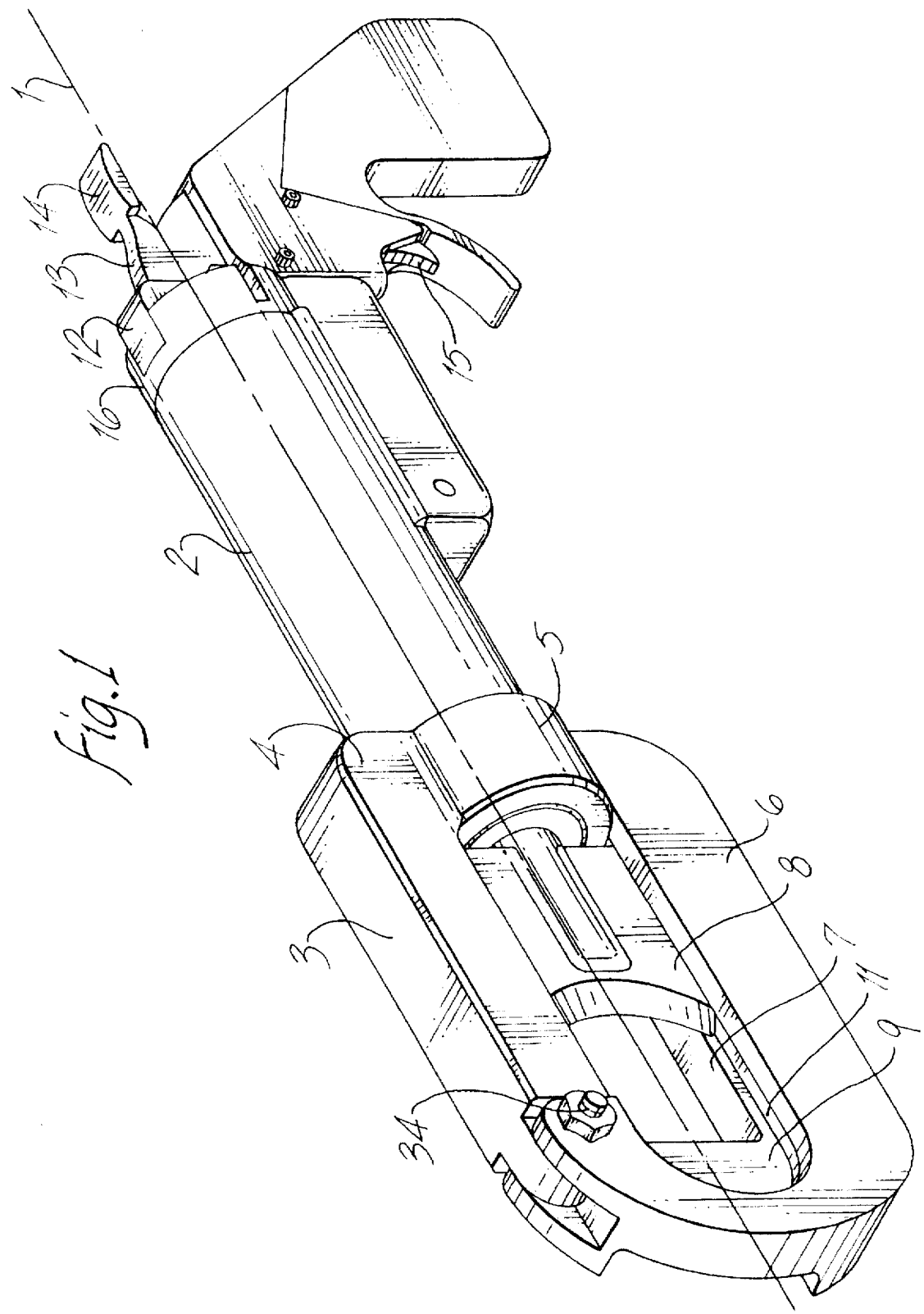
FIG. 1 is a perspective view of the cable cutting tool of this invention.
Figure 2:
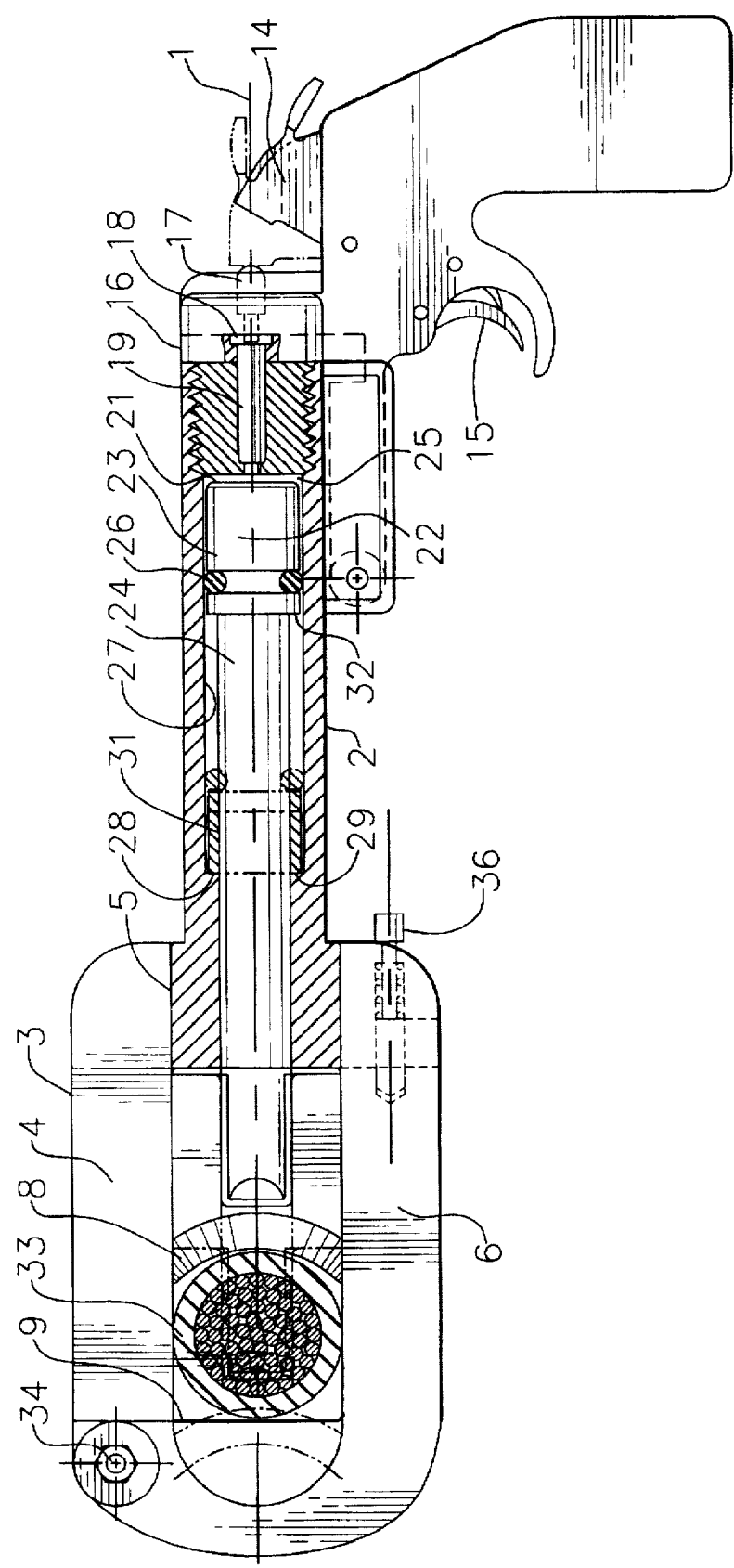
FIG. 2 is an in-part cross-sectional view of the cutting tool of this invention illustrating by phantom lines the completed stroke of the piston member and cutting blade.

The explosive cartridge actuated cable cutting device of this invention is shown in perspective in FIG. 1 and has a longitudinal axis 1, a housing 2, and a frame 3 extending axially of the housing. A second section 6 of the frame 3 is pivotally connected to first section 4; the pivotal connection of second section 6 to frame 3 permits the cable which is to be cut to be held in the stroke zone 7. As can be seen in FIG. 1, stroke zone 7 is defined by the region between cutting blade 8 and reaction blade 9. Reaction blade 9 is mounted in fixed relationship with the second section of frame 3 and is laterally spaced from cutting blade 8 to permit the cable to be sheared when the cutting blade is displaced through the stroke zone 7. As is further illustrated in FIG. 1, cutting blade 8 is mounted such that upon the latching of second section 6 to the housing (the latching mechanism is shown in FIG. 2), the cutting blade will be directed axially through the cutting zone 7 by guide track 11. Although not shown in FIG. 1, the first section of frame 3 also contains a guide track which is oppositely and laterally spaced from the axis for receiving the upper portion of the cutting blade thereby confining the displacement of the cutting blade to an axial direction through the cutting zone. By fixing reaction blade 9 to second section 6 and pivotally mounting the second section to the frame, the overall stroke of the cutting blade is thereby reduced. The reduction of stroke allows for a more controlled dissipation of kinetic energy of the blade and permits multiple firings of cartridges without damage to the blades or structure.

Referring now to the breech end 12 of the housing 2, it can again be seen in FIG. 1 that a firing mechanism 13 is provided which comprises a hammer 14 for striking a firing pin and a trigger 15 to actuate the hammer. A cylinder head member 16 is threaded into the housing and contains a cartridge bore for holding the cartridge during detonation. By referring to FIG. 2, the structure of the breech end 12 and of the cutting tool itself can more clearly be seen. 2 and upon actuation the trigger mechanism is driven into the head 18 of the cartridge thereby initiating detonation. The cartridge is contained within the cartridge bore 19 where cartridge bore 19 is in fluid communication with the top surface 21 of piston member 22. Piston member 22 is comprised of a piston head 23 and a piston rod 24. In order to seal the piston head to prevent explosive gases from escaping the cylinder chamber 25, an O-ring 26 is utilized.

Piston member 22 is slideably mounted within longitudinal bore 27; as can be seen in FIG. 2, longitudinal bore 27 has a circumferential step 28 which forms a reaction shoulder 29 in the bore against which shock attenuator sleeve 31 compressively bears during the dissipation of the kinetic energy of the piston member. Near the completion of the cutting stroke, the radially extending impact shoulder 32 which is located at the juncture of the piston head and the piston rod compressively engages shock attenuator sleeve 31 and compresses the sleeve against reaction shoulder 29 thereby dissipating the kinetic energy of the piston member at the conclusion of the cutting stroke.

The cutting blade 8 is carried by the piston rod and is displaced axially through the distance A during the stroke of the piston member. As can be seen in FIG. 1 cutting blade 8 and reaction blade 9 are laterally displaced to permit the cable 33 to be sheered during the stroke. The shearing of the cable requires some lateral displacement of the cutting blade from the reaction blade; the lateral displacement of the cutting and reaction blades minimizes the distortion in the cable after it is cut. This is an important feature of the invention because it minimizes the deformation of the cut section and therefore permits the cable to be reworked and easily reattached.

In operation, the second section 6 of frame 3 is permitted to rotate about the pivot point 34 to open the stroke zone 7; this occurs when the latch member 36 is displaced axially in the direction of the breech end of the cutting tool. After the site of the cut is determined, the second section 6 of frame 3 is clamped around the cable and the latch member 36 locked into the housing. The cartridge is then fired and the high pressure gases rapidly accelerate the piston member and cutting blade to shear the cable. Near the conclusion of the cutting stroke as shown by the distance A in FIG. 2, the impact shoulder 32 of the piston head 23 compressively engages shock attenuator sleeve 31 and compresses the sleeve against reaction shoulder 29. The preferred material of the shock attenuator sleeve 31 is polyurethane which efficiently dissipates the kinetic energy of the piston member over a very short distance and stops the cutting stroke. Even without a cable in the stroke zone 7, the shock attenuator sleeve efficiently dissipates the energy of the piston member without damage to the cutting blade or the reaction blade.

To provide gas quickly under high pressure it is preferred that the cartridge have a solid propellant such as black powder. There are many methods in the prior art for detonating gun powder. The preferred firing means of this invention is the combination of the trigger, hammer and firing pin. Other means of detonation are described in U.S. Pat. No. 5,465,490 but these means have not proved to be economically suitable for use in the field when cutting high transmission lines.

While I have shown and described an explosive cartridge actuated cable cutter, it is to be understood that the invention is subject to many modifications without departing from the scope and spirit of the claims as recited herein. This invention is not to be limited by the embodiment shown in the drawing and described in the description which is given by way of example and not of limitation.

What is claimed is:

1. An explosive cartridge actuated cable cutter device comprising:

(a) a housing having a longitudinal axis and an axially extending bore therein said bore having a circumferential step extending radially defining a reaction shoulder;

(b) a frame carried by said housing and extending axially;

(c) a reaction blade carried by said frame and extending laterally and across said longitudinal axis;

(d) a piston member comprising a piston head and a piston rod where said piston member is slideably mounted in said bore for axial displacement relative to said housing, said piston member further comprising a radially extending impact shoulder having a diameter greater than said piston rod;

(e) a cutting blade carried by said piston rod and extending laterally across said longitudinal axis where said cutting blade and said reaction blade are substantially parallel and laterally displaced;

(f) a cylinder head member removably mounted to said housing having an axially extending cartridge bore therein for receiving said explosive cartridge where said cartridge bore is in fluid communication with said piston head such that upon detonation of said explosive cartridge the explosive energy is transformed into kinetic energy of said piston member;

(g) a compressibly deformable attenuator sleeve mounted in slideable relationship with said piston rod and so adapted within said housing to permit compressive deformation of said attenuator sleeve between said impact shoulder and said reaction shoulder such that upon sufficient axial displacement of said impact shoulder the deformation of said attenuator sleeve will dissipate the kinetic energy of said piston member; and (h) firing means associated with said cylinder head for detonating said explosive cartridge, where said frame comprises a first section extending axially from said housing and a second section pivotally mounted to said first section.

2. The explosive cartridge cable cutter device recited in claim 1 where said reaction blade is mounted in fixed relationship with said second section.

3. An improved cable cutter device of the type having a housing having a longitudinal axis and an axially extending bore therein, a frame carried by said housing and extending axially, a reaction blade carried by said frame and extending laterally across said axis, a piston member comprising a piston head and piston rod slideably mounted in said bore for axial displacement relative to said housing, a cutting blade carried by said piston rod, a cylinder head member removably mounted to said housing and having an axially extending cartridge bore to receive m explosive cartridge, a firing device for detonating an explosive cartridge wherein the improvement comprises said axially extending bore having a circumferential step extending radially within said bore defining a reaction shoulder, said piston head having a radially extending shoulder which has a diameter greater than said piston rod, a compressibly deformable attenuator sleeve mounted in slideable relationship with said piston rod and so adapted within said housing to permit compressive deformation of said attenuator sleeve between said impact shoulder and said reaction shoulder such that upon sufficient axial displacement of said impact shoulder deformation of said attenuator sleeve will dissipate the kinetic energy of said piston member, where said frame comprises a first section extending axially from said housing and a second section pivotally mounted to said first section.

4. The improved cable cutter device recited in claim 3 where said reaction blade is mounted in fixed relationship with said second section.

* * * * *